US009148592B2

United States Patent
Kim

(10) Patent No.: US 9,148,592 B2
(45) Date of Patent: Sep. 29, 2015

(54) APPARATUS AND METHOD FOR NOISE CANCELLATION OF OPTICAL IMAGE STABILIZER

(71) Applicant: SAMSUNG ELECTRO-MECHANICS CO., LTD., Gyeonggi-Do (KR)

(72) Inventor: Joo Hyun Kim, Gyeonggi-Do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/298,617

(22) Filed: Jun. 6, 2014

(65) Prior Publication Data
US 2015/0172572 A1  Jun. 18, 2015

(30) Foreign Application Priority Data
Dec. 17, 2013  (KR) ......................... 10-2013-0156996

(51) Int. Cl.
*H04N 5/232* (2006.01)
*H04N 5/357* (2011.01)
*G10K 11/175* (2006.01)

(52) U.S. Cl.
CPC .............. *H04N 5/357* (2013.01); *G10K 11/175* (2013.01); *H04N 5/2328* (2013.01)

(58) Field of Classification Search
CPC . H04N 5/357; H04N 5/2328; H04N 5/23251; H04N 5/144; H04N 5/23258; H04N 5/23287; H04N 5/217; G10K 11/175; G03B 2217/005; G03B 2205/0007; G03B 2205/0015
See application file for complete search history.

(56) References Cited

U.S. PATENT DOCUMENTS

| 8,842,198 B2* | 9/2014 | Sekiya et al. .............. 348/231.4 |
| 8,908,877 B2* | 12/2014 | Abdollahzadeh Milani et al. ............................. 381/71.1 |
| 8,958,571 B2* | 2/2015 | Kwatra et al. ............... 381/94.1 |
| 2006/0247927 A1* | 11/2006 | Robbins et al. ............... 704/225 |
| 2008/0304677 A1* | 12/2008 | Abolfathi et al. ............ 381/71.1 |
| 2010/0026858 A1* | 2/2010 | Kanamori ..................... 348/241 |
| 2011/0032390 A1 | 2/2011 | Lee et al. |
| 2011/0063461 A1* | 3/2011 | Masuda ................... 348/208.11 |
| 2015/0003620 A1* | 1/2015 | Wu et al. ..................... 381/71.1 |
| 2015/0116519 A1* | 4/2015 | Jarske et al. ............. 348/208.12 |

* cited by examiner

*Primary Examiner* — Aung S Moe
(74) *Attorney, Agent, or Firm* — NSIP Law

(57) ABSTRACT

Embodiments of the invention provide an apparatus for noise cancellation of an optical image stabilizer, which includes a motion sensor configured to sense a motion, a microphone configured to acquire a sound, a speaker configured to output a sound, and a controller. The controller is configured to determine whether at least one predetermined condition is satisfied based on at least one signal input from the motion sensor and the microphone, when it is determined that the at least one predetermined condition is satisfied, to periodically operate the optical image stabilizer to store one or more noises generated from an actuator within the optical image stabilizer and driving information of the actuator in a memory, and then, when the optical image stabilizer is normally operated, to acquire the one or more noises corresponding to the driving information of the actuator from the memory, and to generate a canceling noise and to output the generated canceling noise through the speaker.

20 Claims, 4 Drawing Sheets

APPARATUS AND METHOD FOR NOISE CANCELLATION OF OPTICAL IMAGE STABILIZER

CROSS REFERENCE TO RELATED APPLICATION

This application claims the benefit of and priority under 35 U.S.C. §119 to Korean Patent Application No. KR 10-2013-0156996, entitled "APPARATUS AND METHOD FOR NOISE CANCELLATION OF OPTICAL IMAGE STABILIZER," filed on Dec. 17, 2013, which is hereby incorporated by reference in its entirety into this application.

BACKGROUND

1. Field of the Invention

The present invention relates to an apparatus and a method for operation noise cancellation of an optical image stabilizer (OIS).

2. Description of the Related Art

As an actuator for operating an OIS in an OIS camera module for mobile devices, such as a smart phone to make a size thereof small or a voice coil motor (VCM), has been used. The VCM used as the actuator in the OIS generates noises due to a user's hand-shake operation. The VCM serves to move a lens or an image sensor for image stabilization against the user's hand-shake. In this case, the noises that the user may hear are generated.

When the smart phone photographs a moving picture, the noises from the VCM are stored through a microphone (including mike or mic) of the smart phone, along with moving picture data, which are photographed by the camera module and when the moving picture photographed by the user is played, the user hears the noises from the VCM, interfering with the moving picture recording.

Because the noises from the VCM may be slightly different depending on an assembling deviation of the VCM, different noise canceling sounds need to be made for each smart phone. Further, the motor is worn depending on the use time of the VCM, and therefore the noises from the VCM may be changed.

The conventional art, as described, for example, in U.S. Patent Publication No. 2011/0032390 of Lee, describes a digital photographing apparatus and a method for photographing a moving picture using the same capable of an operation of noise cancellation of the digital photographing apparatus in photographing a moving picture including a voice. However, Lee is unable to cancel sound generated by moving parts of the digital photographing apparatus, an operation type of a motor, a rotating direction of a barrel, as non-limiting examples, which are stored in a storage unit in advance, and therefore a large-capacity storage space may be required, because of the wear of the motor based on the use time of the VCM is not considered and it is difficult to actively cope with a change in noises of the VCM based on the use time of the VCM and a change in noise depending on the surrounding environment is not made, and therefore the noises of the VCM may not be effectively removed.

SUMMARY

Accordingly, embodiments of the invention have been made in an effort to provide an apparatus and a method for noise cancellation of an OIS capable of canceling noises of an actuator which are changed based on an assembling deviation and a use time of the actuator within the OIS by using a small-capacity memory space.

According to at least one embodiment, there is provided an apparatus for noise cancellation of an optical image stabilizer, which includes a motion sensor configured to sense a motion, a microphone configured to acquire a sound, a speaker configured to output a sound, and a controller. The controller is configured to determine whether at least one predetermined condition is satisfied based on at least one signal input from the motion sensor and the microphone, when it is determined that the at least one predetermined condition is satisfied, to periodically operate the optical image stabilizer to store one or more noises generated from an actuator within the optical image stabilizer and driving information of the actuator in a memory, and then, when the optical image stabilizer is normally operated, to acquire the one or more noises corresponding to the driving information of the actuator from the memory, and to generate a canceling noise and to output the generated canceling noise through the speaker.

According to an embodiment, the actuator includes a voice coil motor.

According to an embodiment, the controller is further configured to generate one or more modeling parameters for the one or more noises from the voice coil motor stored in the memory using a sound modeling method, to store the generated one or more modeling parameters in the memory, to delete the one or more noises from the voice coil motor stored in the memory, when the optical image stabilizer is normally operated, to synthesize the one or more noises based on the one or more modeling parameters of the one or more noises corresponding to the driving information of the voice coil motor stored in the memory, and to generate the canceling noise, which is an anti-phase to the synthesized noise and to output the generated canceling noise through the speaker.

According to an embodiment, the sound modeling method includes a hidden Markov model-based speech modeling method.

According to an embodiment, the optical image stabilizer, the motion sensor, and the speaker each are an optical image stabilizer, a motion sensor, and a speaker, which are included in a mobile device and the controller includes an application processor included in the mobile device.

According to an embodiment, the at least one predetermined condition includes one of no motion based on a signal sensed by the motion sensor, no surrounding noise based on a signal acquired by the microphone, and a camera module looks upwardly based on the signal sensed by the motion sensor.

According to an embodiment, the optical image stabilizer includes an optical image stabilizer included in a camera module of the mobile device. The controller is further configured to operate the optical image stabilizer whenever the mobile device is turned on or at a predetermined time when the at least one predetermined condition is satisfied and to store the one or more noises from the voice coil motor due to the operation of the optical image stabilizer and the driving information of the voice coil motor in the memory.

According to an embodiment, the motion sensor includes one of an acceleration sensor and a gyro sensor included in the mobile device.

According to an embodiment, the mobile device includes a smart phone.

According to an embodiment, the controller is further configured to operate the voice coil motor to move a lens within a camera module in any direction within an operation range, when the at least one predetermined condition is satisfied.

According to another embodiment of the invention, there is provided a method for noise cancellation of an optical image stabilizer, which includes determining, by a controller, whether at least one predetermined condition is satisfied based on at least one signal input from a motion sensor and a microphone and when the at least one predetermined condition is satisfied, periodically operating the optical image stabilizer to store one or more noises from an actuator within the optical image stabilizer and driving information of the actuator in a memory. The method further includes, when the optical image stabilizer is normally operated, acquiring the one or more noises corresponding to the driving information of the actuator from the memory and generating a canceling noise and outputting the generated canceling noise through a speaker, by the controller.

According to the method embodiment, the actuator includes a voice coil motor.

According to the method embodiment, the method further includes generating, using the controller, one or more modeling parameters for the one or more noises from the voice coil motor stored in the memory using a sound modeling method, storing the generated one or more modeling parameters in the memory, deleting the one or more noises from the voice coil motor stored in the memory, when the optical image stabilizer is normally operated, synthesizing the one or more noises based on the one or more modeling parameters of the one or more noises corresponding to the driving information of the voice coil motor stored in the memory, and generating the canceling noise, which is an anti-phase to the synthesized noise and to output the generated canceling noise through the speaker.

According to the method embodiment, the sound modeling method includes a hidden Markov model-based speech modeling method.

According to the method embodiment, the optical image stabilizer, the motion sensor, and the speaker each are an optical image stabilizer, a motion sensor, and a speaker, which are included in a mobile device and the controller includes an application processor included in the mobile device.

According to the method embodiment, the at least one predetermined condition includes one of no motion based on a signal sensed by the motion sensor, no surrounding noise based on a signal acquired by the microphone, and a camera module looks upwardly based on the signal sensed by the motion sensor.

According to the method embodiment, the optical image stabilizer includes an optical image stabilizer included in a camera module of the mobile device, and the controller is further configured to operate the optical image stabilizer whenever the mobile device is turned on or at a predetermined time when the at least one predetermined condition is satisfied and to store the one or more noises from the voice coil motor due to the operation of the optical image stabilizer and the driving information of the voice coil motor in the memory.

According to the method embodiment, the motion sensor includes one of an acceleration sensor and a gyro sensor included in the mobile device.

According to the method embodiment, the mobile device includes a smart phone.

According to the method embodiment, the controller is further configured to operate the voice coil motor to move a lens within a camera module in any direction within an operation range, when the at least one predetermined condition is satisfied.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
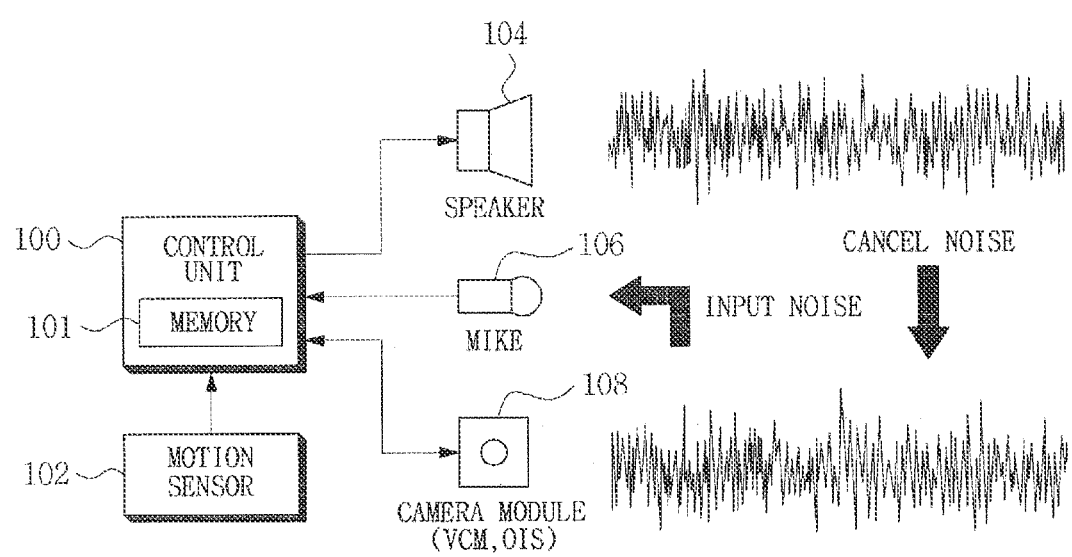
FIG. 1 is a block diagram of an apparatus for noise cancellation of an OIS according to an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Figure 2:
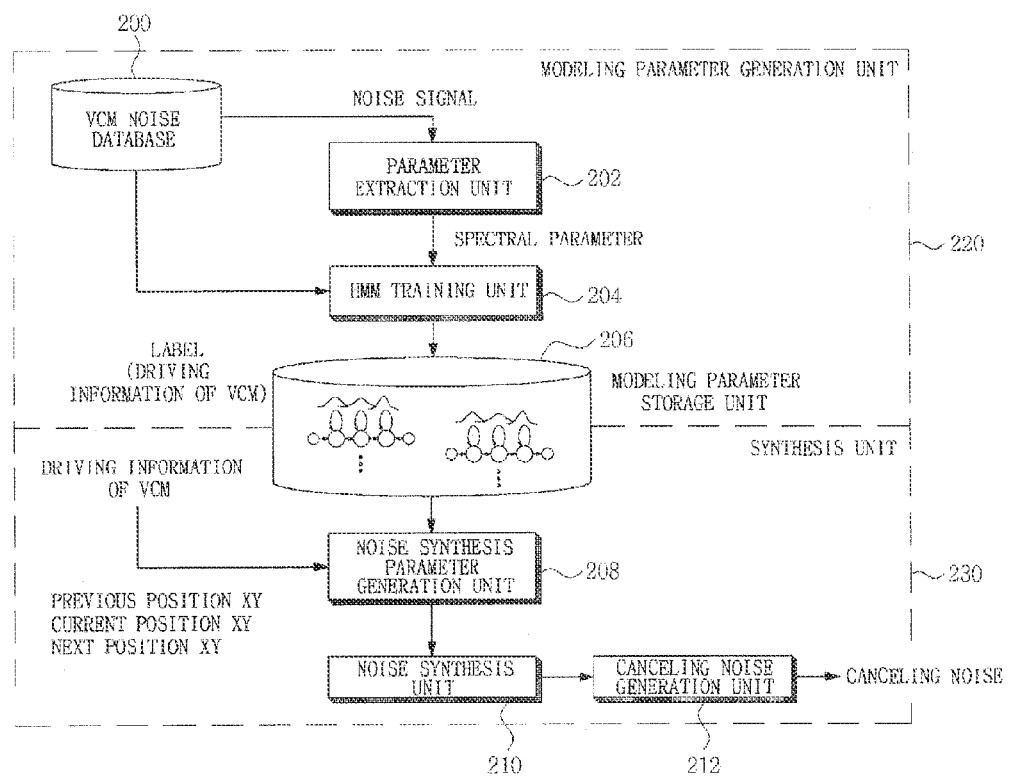
FIG. 2 is a diagram illustrating a hidden Markov model-based speech synthesis module in the apparatus for noise cancellation of the OIS according to an embodiment of the invention.

FIG. 1 is a block diagram of an apparatus for noise cancellation of an OIS according to an embodiment of the invention, and FIG. 2 is a diagram illustrating a hidden Markov model-based speech synthesis module in the apparatus for noise cancellation of the OIS according to an embodiment of the invention.

Hereinafter, an apparatus for noise cancellation of an OIS according to an embodiment of the invention will be described with reference to FIGS. 1 and 2.

As shown in FIGS. 1 and 2, the apparatus for noise cancellation of an OIS according to an embodiment of the invention, includes a motion sensor 102, which senses a motion, a microphone 106, which acquires a sound, a speaker 104, which outputs the sound, and a controller or a control unit 100, which determines whether predetermined conditions are satisfied based on a signal input from the motion sensor 102 and the microphone 106. If it is determined that the predetermined conditions are satisfied, the apparatus, according to an embodiment of the invention, periodically operates the OIS included in the camera or camera module 108 to store noises from a VCM, which is an actuator within the OIS, and driving information of the VCM in a memory 101, and then when the optical image stabilizer is normally operated, acquires noises corresponding to the driving information of the VCM from the memory 101, and generates a canceling noise and outputs the generated noise through the speaker 104.

According to at least one embodiment, the apparatus for noise cancellation of the OIS according to an embodiment of the invention, is used to cancel the noises of the OIS included in mobile devices, such as a smart phone, as a non-limiting. According to at least one embodiment, the control unit 100 is, for example, an application processor (AP) of the smart phone, the motion sensor 102 is, for example, a gyro sensor of the smart phone, and the speaker 104 and the microphone 106 are each, for example, a speaker and a microphone of the smart phone, respectively.

According to at least one embodiment, the apparatus includes the OIS and is applied to any types of mobile devices, which photograph a moving picture.

For illustrative purposes, it is assumed that the apparatus for noise cancellation of the OIS according to various embodiments of the invention, as discussed further in detail below, is applied to the smart phone.

According to at least one embodiment, the control unit 100 generates modeling parameters from the noises for the VCM stored in the memory 101 using a speech modeling method and stores the generated modeling parameters in the memory 101, deletes the noises from the VCM stored in the memory 101, when the OIS is normally operated, synthesizes the noises based on the modeling parameters of noises corresponding to the driving information of the VCM stored in the memory 101, and generates the canceling noise, which is an anti-phase of the synthesized noise and outputs the generated canceling noise through the speaker 104.

The case in which the predetermined conditions are satisfied include, for example, a case in which it is determined that there is no motion based on a signal sensed by the motion sensor 102, it is determined that there is no surrounding noises based on a signal acquired by the microphone 106, and it is determined that the camera module 108 looks upwardly based on the signal sensed by the motion sensor 102.

When the predetermined conditions are satisfied, the control unit 100 operates the OIS whenever the apparatus including the OIS, for example, the mobile device, such as a smart phone is turned on or at a predetermined time and stores the noises from the VCM due to the operation of the OIS and the driving information of the VCM in the memory 101.

When the predetermined condition is satisfied, the control unit 100 operates the VCM to move the lens (not illustrated) within the camera module 108 in any direction within the operation range.

According to at least one embodiment, the motion sensor 102 includes an acceleration sensor or a gyro sensor, which is included in a smart phone.

The operation of the apparatus for noise cancellation of the OIS according to various embodiments of the invention configured as described above will be described in further detail below.

Since the noises from the VCM may be slightly different for each module depending on an assembling deviation of the VCM included in the OIS within the camera module 108 of the smart phone, different canceling noises need to be made. Further, since the noises from the VCM may be changed due to the wear of the motor depending on the use time of the VCM, the canceling noise needs to be periodically updated. According to at least one embodiment of the invention, the smart phone itself periodically updates automatically the modeling parameters for the noises using a hidden Markov model (HMM)-based speech synthesis module and, when the VCM is normally operated, the noises corresponding to the VCM operation are synthesized based on the automatically updated modeling parameter and then the canceling noise, which is an anti-phase noise is generated, such that the VCM noise is canceled.

When the predetermined conditions are satisfied, the control unit 100 periodically receives the noises generated by arbitrarily operating the VCM in the OIS within the camera module 108 through the microphone 106 of the smart phone (not illustrated). The control unit 100 models the noises from the VCM input through the microphone 106 using the HMM-based speech modeling method to store only the modeling parameters for the noises in the memory 101.

According to at least one embodiment, the modeling parameters are basis data which may make all the specific sounds, but have an extremely small amount of information, as compared with the sound data. As described above, according to the preferred embodiment of the present invention, only the modeling parameters for the noises from the VCM due to the periodic operation of the VCM are stored in the memory 101, the noises from the VCM corresponding to the VCM operation are synthesized using the modeling parameters, and then the canceling noise which is the anti-phase noise is generated, such that the noises from the VCM may be removed using a small-capacity memory.

For example, according to an embodiment of the invention, to accurately acquire the modeling parameters for the noises generated when the VCM is operated, VCM noise original data for the noises generated by operating the VCM once to five times in connection with one VCM operation are stored in the memory 101 and are modeled to generate the accurate modeling parameters for the noises from the VCM and the generated modeling parameters are stored in the memory 101.

When the modeling parameter for one VCM operation is generated, the control unit 100 deletes the VCM noise original data stored in the memory 101, such that only the modeling parameters for the noises from the VCM corresponding to the VCM operation remain along with the driving information of the VCM. Therefore, according to at least one embodiment of the invention, the noises from the VCM are canceled and removed using the small-capacity memory.

According to at least one embodiment, the HMM-based speech synthesis module in the apparatus for noise cancellation of the OIS according to an embodiment of the invention, as shown in FIG. 2, is included in the control unit 100. The HMM-based speech synthesis module, as shown in FIG. 2, includes a modeling parameter generator 220 and a synthesizer or synthesis unit 230. The modeling parameter generator or generation unit 220 includes a VCM noise database 220, a parameter extractor or extraction unit 202, an HMM trainer or training unit 204, and modeling parameter storage or storage unit 206. The synthesizer 230 includes a noise synthesis parameter generator or generation unit 208, a noise synthesizer or synthesis unit 210, and a canceling noise generator or generation unit 212.

According to at least one embodiment, the modeling parameter generation unit 220 models the noises from the VCM input through the microphone 106 to generate the modeling parameters and the synthesis unit 230 synthesizes the noises corresponding to the driving information of the VCM using the modeling parameters generated from the modeling parameter generation unit 220 and then generates the canceling noise which is the anti-phase noise and then outputs the generated canceling noise to the speaker 104.

According to at least one embodiment, in the HMM-based speed synthesis module shown in FIG. 2, the VCM noise database 200 is included in the memory 101 included in the control unit 100 of FIG. 1, and the noises generated from the VCM depending on the operation of the OIS are stored in the VCM noise database 200 included in the memory 101.

According to an embodiment of the invention, to acquire the accurate modeling parameters for the noises generated when the VCM is operated, the control unit 100 repeatedly operates the VCM about once to five times in connection with one VCM operation, such that the noises generated by operating the VCM are temporarily stored in the VCM noise database 200.

According to at least one embodiment, the parameter extraction unit 202 extracts the parameter from the noise signal stored in the VCM noise database 200 and the HMM training unit 204 determines the accurate parameters for the noises and stores the determined parameters in the modeling parameter storage unit 206. The modeling parameter storage unit 206 is included in the memory 101 of the control unit 100 and after the modeling parameters for the noises generated by operating the VCM are stored in the modeling parameter storage unit 206, the control unit 100 deletes the VCM noise original data, which are stored in the VCM noise database 200.

According to at least one embodiment, the noise synthesis parameter generation unit 208 generates the parameters for generating the noises corresponding to the driving information of the VCM using the modeling parameters stored in the modeling parameter storage unit 206, based on the driving information of the VCM. The noise synthesis unit 210 synthesizes the noises from the VCM corresponding to the driving information of the VCM based on the noise synthesis parameters received from the noise synthesis parameter generation unit 208. The canceling noise generation unit 212 generates the canceling noise which is the anti-phase noise to the synthesized VCM noise and outputs the generated canceling noise to the speaker 104, thereby canceling and removing the noises from the VCM.

Figure 3:
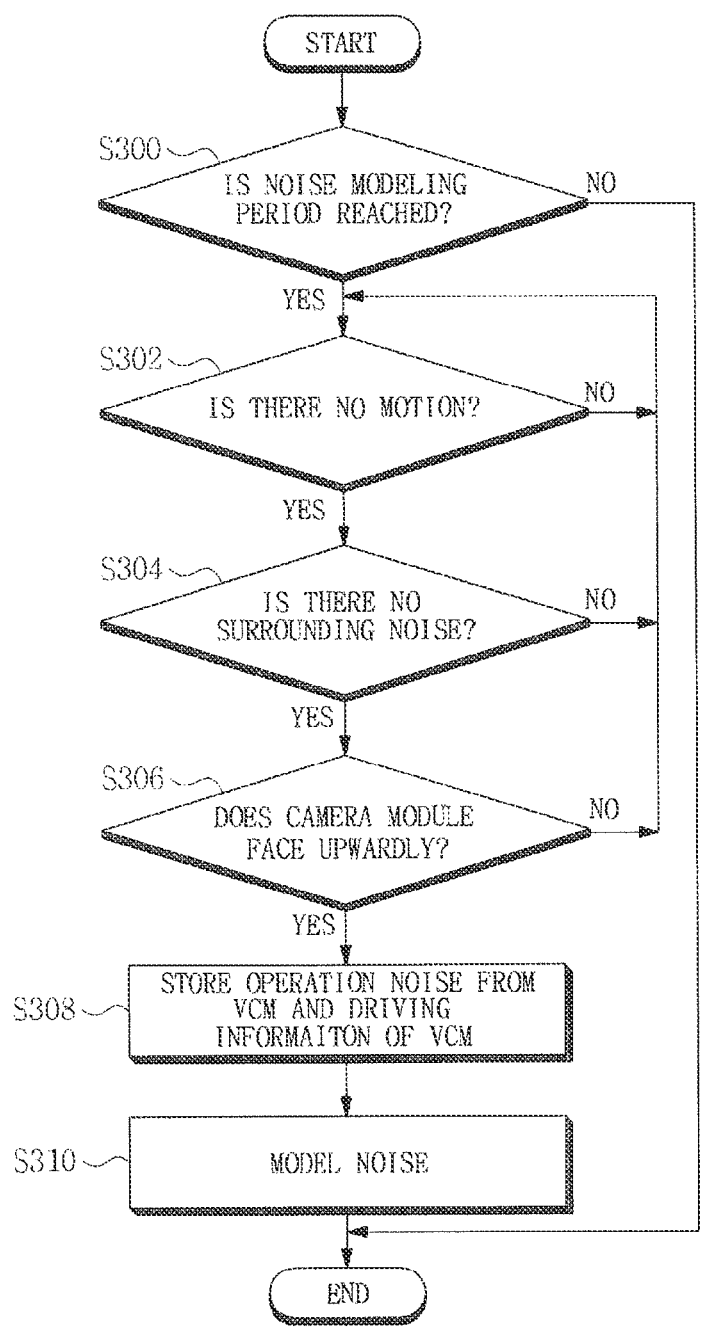
FIG. 3 is a flow chart illustrating a noise modeling method for generating modeling parameters in the method for noise cancellation of the OIS according to an embodiment of the invention.
Figure 4:
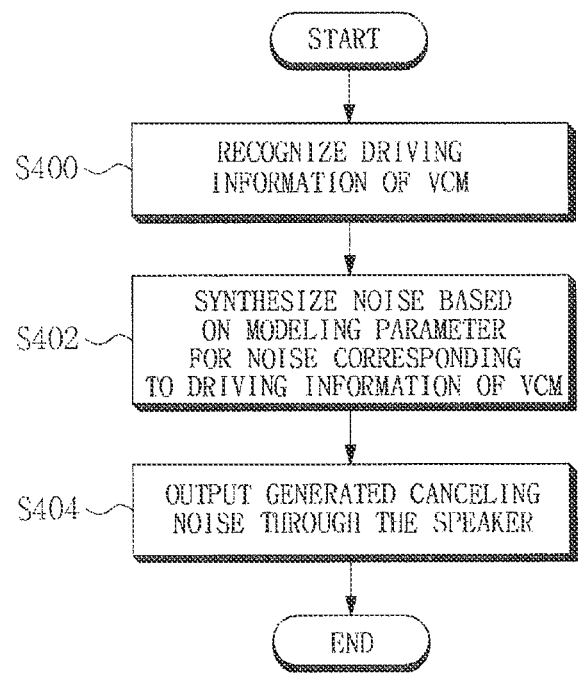
FIG. 4 is a flow chart illustrating a method for generating a canceling noise using modeling parameters in the method for noise cancellation of the OIS according to an embodiment of the invention.

FIG. 3 is a flow chart illustrating a noise modeling method for generating modeling parameters in the method for noise cancellation of the OIS according to an embodiment of the invention. FIG. 4 is a flow chart illustrating a method for generating a canceling noise using modeling parameters in the method for noise cancellation of the OIS according to an embodiment of the invention.

Hereinafter, a method for noise cancellation of an OIS according to various embodiments of the invention will be described with reference to FIGS. 1 to 4.

In step S300, the control unit 100 determines whether a noise modeling period is reached.

Even though the noises generated from the VCM used in the OIS are the same model, the noises may be different for each module depending on the control speed and the assembling deviation. Since different noises are generated for each module, the noise modeling needs to be performed for each smart phone to cancel the noises from the VCM. Further, the noise modeling is performed even at the time of shipped from a factory, but needs to cope with a change in sound depending on the use of the user.

Therefore, in the method for noise cancellation of the OIS according to an embodiment of the invention, the noise modeling generating the modeling parameters based on the noises from the VCM is performed whenever the smart phone is turned on or periodically performed automatically at each predetermined time, such as every time.

In step S300, the control unit 100 determines whether the smart phone is turned on or the predetermined time is reached and thus determines whether a noise modeling period is reached.

When the noise modeling period is reached, in step S302, the control unit 100 determines whether the motion of the smart phone is not present. For the noise modeling, the control unit 100 uses the motion sensor 102, such as the acceleration sensor and the gyro sensor of the smart phone to determine whether the motion is present.

According to at least one embodiment, if it is determined that the motion is not present, in step S304, the control unit 100 determines whether the surrounding noises are present based on the microphone 106 equipped in the smart phone. The determination on whether the noises are present is made by detecting the energy of the output signal from the microphone 106 in a specific time and comparing the energy with a preset threshold value. The threshold value is set by various experiments.

When the surrounding noises are not present, in step S306, the control unit 100 determines whether the camera module 108 faces upwardly. If it is determined that the surroundings are quite, the control unit 100 uses the motion sensor 102, such as the acceleration sensor of the smart phone, to determine whether the camera module 108 faces upwardly.

When the camera module 108 of the smart phone faces downwardly, since it is difficult to accurately detect the noises from the VCM, the control unit 100 determines whether the camera module 108 of the smart phone faces upwardly.

Figure 5:
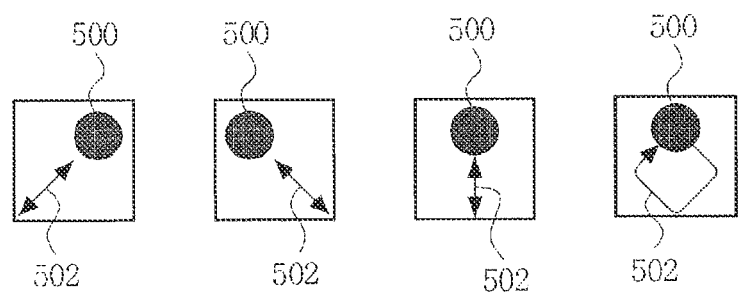
FIG. 5 is a diagram illustrating various forms of operation of the VCM to generate various types of VCM noises in the method for noise cancellation of an optical image stabilizer according to an embodiment of the invention.

When all the conditions are satisfied, in step S308, the control unit 100 arbitrarily operates the OIS included in the camera module 108 and stores the operation noises of the VCM depending on the operation of the OIS in the memory 101 through the microphone 106. In this case, to generate various types of VCM noises, the VCM, according to at least one embodiment, is operated in various forms as shown in FIG. 5. In FIG. 5, reference numeral 500 represents the lens, reference numeral 502 represents the lens barrel, and an arrow represents a path through which the lens 500 moves.

Since only after the noises from the VCM through the microphone 106 and whether the VCM is driven in any form need to be aware, the canceling noise, which is the anti-phase noise is generated by synthesizing the noises corresponding to the VCM operation at the time of normally operating the OIS, the control unit 100 also stores the driving information of the VCM in the memory 101.

In step S310, the control unit 100 performs the modeling on the stored noises from the VCM using the HMM to generate the modeling parameters and stores only the modeling parameters of the noises from the VCM in the memory 101. As described above, after the modeling parameters of the noises from the VCM are generated and stored in the memory 101, the control unit 100 deletes the original data for the operation noises of the VCM stored in the memory 101 from the memory 101. Therefore, after the modeling parameters are generated by the noise modeling, only the modeling parameters remain in the memory 101 along with the driving information of the VCM.

Since the noise modeling method for generating modeling parameters in the method for noise cancellation of the OIS according to an embodiment of the invention as shown in FIG.

3 is repeatedly performed, when the noise modeling period is reached and the predetermined conditions are satisfied, the plurality of modeling parameters and the driving information of the VCM corresponding to the various operation noises of the VCM are stored in the memory 101.

Meanwhile, after the modeling parameters are generated, since the control unit 100 deletes the VCM noise original data depending on the VCM operation, which are acquired through the microphone 106 from the memory 101, only the plurality of modeling parameters corresponding to various operation noises of the VCM and the driving information of the VCM remain in the memory 101.

At the time of the normal operation of the OIS, in step S400 of FIG. 4, the control unit 100 recognizes the driving information of the VCM depending on the operation of the OIS and in step S402, the modeling parameters for the noises corresponding to the driving information of the VCM are acquired from the memory 101, and thus the noises corresponding to the driving information of the VCM are synthesized.

In step S404, the control unit 100 generates the canceling noise, which is the anti-phase noise of the synthesized noise of the VCM and outputs the generated canceling noise through the speaker 104. The noises from the VCM of the OIS are canceled and removed by the canceling noise of the noises from the VCM output through the speaker 104.

According to various embodiments of the invention, the noises from the VCM input through the microphone 106 are temporarily stored in the memory 101 and after the modeling parameter is generated, are deleted from the memory 101. Thus, after the modeling parameters are generated and then are stored in the modeling parameter storage unit 206, the VCM noise original data are deleted from the VCM noise database 200. Therefore, only a small amount of modeling parameters for the noises from the VCM remains in the memory 101 along with the driving information of the VCM. Therefore, according to at least one embodiment of the invention, it is possible to cancel the noises generated, when the VCM is operated by using the small-capacity memory without using the large-capacity memory as in the conventional art.

Further, according to various embodiments of the invention, because the noise modeling of the actuator of the OIS is individually and periodically performed on each of the electronic devices including the OIS to generate the canceling noise, it is possible to effectively cancel and remove the noises from the actuator, which are changed depending on the assembling deviation and the use time of the actuator.

According to various embodiments of the invention, it is possible to effectively remove the noises of the actuator, which are changed depending on the assembling deviation and the use time of the actuator within the OIS by using the small-capacity memory space.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. An apparatus for noise cancellation of an optical image stabilizer, the apparatus comprising:
   a motion sensor configured to sense a motion;
   a microphone configured to acquire a sound;
   a speaker configured to output a sound; and
   a controller configured to determine whether at least one predetermined condition is satisfied based on at least one signal input from the motion sensor and the microphone, when it is determined that the at least one predetermined condition is satisfied, to periodically operate the optical image stabilizer to store one or more noises generated from an actuator within the optical image stabilizer and driving information of the actuator in a memory, and then, when the optical image stabilizer is normally operated, to acquire the one or more noises corresponding to the driving information of the actuator from the memory, and to generate a canceling noise and to output the generated canceling noise through the speaker.

2. The apparatus according to claim 1, wherein the actuator comprises a voice coil motor.

3. The apparatus according to claim 2, wherein the controller is further configured to generate one or more modeling parameters for the one or more noises from the voice coil motor stored in the memory using a sound modeling method, to store the generated one or more modeling parameters in the memory, to delete the one or more noises from the voice coil motor stored in the memory, when the optical image stabilizer is normally operated, to synthesize the one or more noises based on the one or more modeling parameters of the one or more noises corresponding to the driving information of the voice coil motor stored in the memory, and to generate the canceling noise, which is an anti-phase to the synthesized noise and to output the generated canceling noise through the speaker.

4. The apparatus according to claim 3, wherein the sound modeling method comprises a hidden Markov model-based speech modeling method.

5. The apparatus according to claim 2, wherein the optical image stabilizer comprises an optical image stabilizer included in a camera module of the mobile device, and
the controller is further configured to operate the optical image stabilizer whenever the mobile device is turned on or at a predetermined time when the at least one predetermined condition is satisfied and to store the one or more noises from the voice coil motor due to the operation of the optical image stabilizer and the driving information of the voice coil motor in the memory.

6. The apparatus according to claim 5, wherein the motion sensor comprises one of an acceleration sensor and a gyro sensor included in the mobile device.

7. The apparatus according to claim 6, wherein the mobile device comprises a smart phone.

8. The apparatus according to claim 2, wherein the controller is further configured to operate the voice coil motor to move a lens within a camera module in any direction within an operation range, when the at least one predetermined condition is satisfied.

9. The apparatus according to claim 1, wherein the optical image stabilizer, the motion sensor, and the speaker each are an optical image stabilizer, a motion sensor, and a speaker, which are included in a mobile device and the controller comprises an application processor included in the mobile device.

10. The apparatus according to claim 1, wherein the at least one predetermined condition comprises one of no motion based on a signal sensed by the motion sensor, no surrounding noise based on a signal acquired by the microphone, and a camera module looks upwardly based on the signal sensed by the motion sensor.

11. A method for noise cancellation of an optical image stabilizer, the method comprising:
determining, by a controller, whether at least one predetermined condition is satisfied based on at least one signal input from a motion sensor and a microphone and when the at least one predetermined condition is satisfied, periodically operating the optical image stabilizer to store one or more noises from an actuator within the optical image stabilizer and driving information of the actuator in a memory; and
when the optical image stabilizer is normally operated, acquiring the one or more noises corresponding to the driving information of the actuator from the memory and generating a canceling noise and outputting the generated canceling noise through a speaker, by the controller.

12. The method according to claim 11, wherein the actuator comprises a voice coil motor.

13. The method according to claim 12, wherein the optical image stabilizer comprises an optical image stabilizer included in a camera module of the mobile device, and
the controller is further configured to operate the optical image stabilizer whenever the mobile device is turned on or at a predetermined time when the at least one predetermined condition is satisfied and to store the one or more noises from the voice coil motor due to the operation of the optical image stabilizer and the driving information of the voice coil motor in the memory.

14. The method according to claim 13, wherein the motion sensor comprises one of an acceleration sensor and a gyro sensor included in the mobile device.

15. The method according to claim 14, wherein the mobile device comprises a smart phone.

16. The method according to claim 12, wherein the controller is further configured to operate the voice coil motor to move a lens within a camera module in any direction within an operation range, when the at least one predetermined condition is satisfied.

17. The method according to claim 12, further comprising:
generating, using the controller, one or more modeling parameters for the one or more noises from the voice coil motor stored in the memory using a sound modeling method;
storing the generated one or more modeling parameters in the memory;
deleting the one or more noises from the voice coil motor stored in the memory, when the optical image stabilizer is normally operated;
synthesizing the one or more noises based on the one or more modeling parameters of the one or more noises corresponding to the driving information of the voice coil motor stored in the memory; and
generating the canceling noise, which is an anti-phase to the synthesized noise and to output the generated canceling noise through the speaker.

18. The method according to claim 17, wherein the sound modeling method comprises a hidden Markov model-based speech modeling method.

19. The method according to claim 11, wherein the optical image stabilizer, the motion sensor, and the speaker each are an optical image stabilizer, a motion sensor, and a speaker, which are included in a mobile device and the controller comprises an application processor included in the mobile device.

20. The method according to claim 11, wherein the at least one predetermined condition comprises one of no motion based on a signal sensed by the motion sensor, no surrounding noise based on a signal acquired by the microphone, and a camera module looks upwardly based on the signal sensed by the motion sensor.

* * * * *